United States Patent [19]
Sweatt, III

[11] Patent Number: 5,986,660
[45] Date of Patent: Nov. 16, 1999

[54] MOTION CAPTURE DATA SYSTEM AND DISPLAY

[75] Inventor: Millard E. Sweatt, III, Menlo Park, Calif.

[73] Assignee: Autodesk, Inc., San Rafael, Calif.

[21] Appl. No.: 09/001,500

[22] Filed: Dec. 31, 1997

[51] Int. Cl.⁶ ................................................. G06F 15/00
[52] U.S. Cl. ............................................................ 345/419
[58] Field of Search .................................. 345/419, 473, 345/474, 475, 425

[56] References Cited

U.S. PATENT DOCUMENTS

| | | | |
|---|---|---|---|
| 5,524,187 | 6/1996 | Feiner et al. | 345/419 |
| 5,675,720 | 10/1997 | Sato et al. | 345/420 |
| 5,687,259 | 11/1997 | Linford | 345/435 |

Primary Examiner—Phu K. Nguyen
Attorney, Agent, or Firm—Wilson, Sonsini, Goodrich & Rosati

[57] ABSTRACT

The present invention is a system and method for displaying and manipulating a multidimensional data set using a computer system. In one embodiment of the invention an input device such as a camera or output from pre-recorded audio-visual data is connected to the computer system. The camera is used to record a data set related to the movement of one or more points on the subject's body. The data set comprises at least 4-dimensions of data and at least one of the dimensions is related to time. The data set is input into the computer and stored in a memory. Three dimensions of the data set are converted into a 3-dimensional perspective data set for display in a display device, and an image is displayed at locations determined by the 3-dimensional perspective data set. The remaining dimensions of the data set which one wishes to display are encoded in an attribute of the displayed images. A selection command is received by the computer system. The selection command selects a portion of the displayed data corresponding to a subset of the data set. A modification signal is received by the computer system. The modification signal modifies data in the subset of the data set.

43 Claims, 5 Drawing Sheets

MOTION CAPTURE DATA SYSTEM AND DISPLAY

BACKGROUND OF THE INVENTION

1. Field of the Invention

The invention relates to the field of motion capture and 3-dimensional or higher data display; and more particularly to the creation and display of motion capture data.

2. Description of Related Art

Two-dimensional and 3-dimensional animation and modeling often begins with the use of live subjects. Live subjects are filmed or video taped and key positions on the subject's body or face are marked. The marked locations are filmed and data related to the marked positions are, using a variety of techniques, digitized and entered into a computer. For example, one might wish to record the facial expressions of an actor as a line of dialog is spoken. The x, y, and z coordinates of critical areas of the actor's face are recorded as time (T) passes. This data is then digitized and entered into a computer. The data can then be used to help create an animated version of the actor's facial expressions.

The data representing the actor's facial motions will often have to be displayed and modified in order to achieve the desired final result. Various techniques are presently available to display and modify data corresponding to facial motion. However, presently available software typically only allows individual dimensions of data to be easily displayed at once. What is needed is a system and method which can display 4-dimensional data, for example, x, y, z, and T in a format which can be easily interpreted by a computer operator and which will allow the data to be easily viewed and altered.

SUMMARY OF THE INVENTION

One embodiment of the invention is a system for displaying and manipulating a multidimensional data set using a computer system. In this embodiment of the invention an input device such as a camera or feed from an audio-video playback device, for example a VCR or film, is connected to the computer system. The camera is used to record a data set related to the movement of one or more points on the subject's body. The data set comprises 4-dimensions, at least one of the dimensions is related to time. Examples of the time related dimension include but are not limited to time elapsed time, frame number, timecode, or time of day.

The data set is input into the computer and stored in a memory. Three of the dimensions of the data set are converted into a 3-dimensional perspective data set for display in a display device, and an image is displayed at locations determined by the 3-dimensional perspective data set. The remaining dimensions of the data set which one wishes to display are encoded in an attribute of the displayed images. A selection command is received by the computer system. The selection command selects a portion of the displayed data corresponding to a subset of the data set. A modification signal is received by the computer system. The modification signal modifies data in the subset of the data set.

Another embodiment of the invention includes a method of displaying and manipulating a data set using a computer system. The computer system includes a computer and a display device. The computer is coupled to the display device, and the computer includes a memory. The data set contains at least 4-dimensions wherein one dimension of the data includes a parameter related to time. The method includes storing the data set in the memory, translating at least a portion of the data set, including the time related parameter, into a 3-dimensional perspective data set, displaying an image at a position on the display device determined by the 3-dimensional perspective data set, wherein an attribute of the image represents data in the data set, receiving a selection command selecting at least a portion of the image, and receiving a modification command modifying data in the data set.

DETAILED DESCRIPTION

Figure 1:
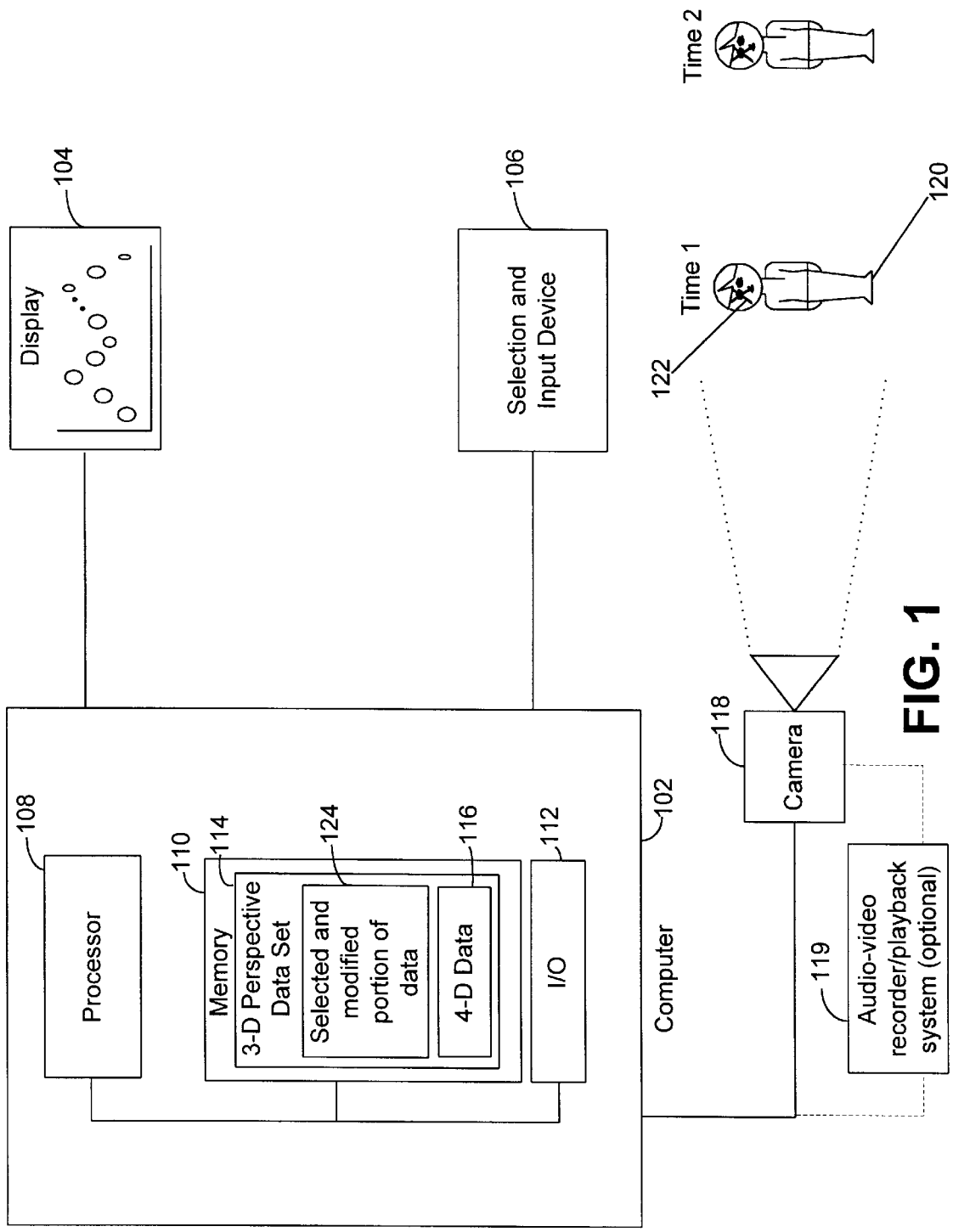
FIG. 1 depicts an embodiment of the invention showing a subject being viewed by a camera to generate a data set for use in accord with the embodiment.

FIG. 1 shows a computer system for displaying and modifying data in accordance with an embodiment of the invention. Computer system 100 includes computer 102, display 104, and selection and input device 106. Computer 102 includes processor 108, memory 110, and input-output device 112. Memory 110 contains 3-dimensional perspective data set 114 and 4-dimensional data set 116.

Computer 102 generically represents any type of computer, such as a microprocessor-based computer, a mainframe computer, or any other type of general or special purpose computer which includes an input-output device, a processor, and a memory. Processor 108 is any type of processor such as a microprocessor, dedicated logic, a digital signal processor, a programmable gate array, a neural network, networked computers, or a central processor unit implemented in any other technology.

Camera 118 is connected to computer 102. Camera 118 is used to input 4-dimensional data set 116 into computer 102. Any other suitable input device could be used without departing from the invention. For example 4-dimensional data set 116 could be input into computer 102 using any type of input device, including but not limited to a digitizing camera, a video camera, an audio-video output from a playback system, a computer, by hand, from another computer application, or an Internet link. One such alternative input source, audio-video recorder/playback system 119, is depicted as an optional input device to computer 102 in FIG. 1. In the embodiment of the invention shown in FIG. 1, camera 118 follows the movements of subject 120 over time.

According to one aspect of the invention, 4-dimensional data set 116 is generated by camera 118 as it tracks the motion of one portion of subject 120 over time. In the embodiment shown in FIG. 1, the data generated by camera 118 is tracking right eye 122 of subject 120. The portion of the data set generated by camera 118 which is to be tracked can be selected in any appropriate way without departing from the invention. For example, camera 118 or any other suitable input device can be configured to output only the data relevant to the portion of the subject being tracked, or the data generated by camera 118 can later be processed to extract the data corresponding to the feature of interest using computer system 100, another computer or any other suitable processor.

In the embodiment of the invention shown in FIG. 1, 4-dimensional data set 116 is input from camera 118 through input-output device 112 of computer system 102 into memory 110. Processor 108 then translates 4-dimensional data set 116 into 3-dimensional perspective data set 114 and stores 3-dimensional perspective data set 114 in memory 110. As depicted in FIG. 1, 4-dimensional data set 116 and 3-dimensional perspective data set 114 are stored in different parts of memory 110. It would not depart from the invention if 4-dimensional data set 116 was overwritten by some or all of 3-dimensional perspective data set 114 or if 4-dimensional data set 116 was not stored in memory 110 but was directly translated into 3-dimensional perspective data set 114.

Three-dimensional perspective data set 114 is displayed on display 104 in accordance with the invention. It would not depart from the invention to use any two or three dimensional display device including but not limited to a CRT, an x-y plotter, a volumetric display device, a holographic display device, or a projection display device. Selection and input device 106 is used to select a selected portion of the 3-dimensional perspective data set 124. Selection and input device 106 can be any device which allows some or all of 3-dimensional perspective data set 114 displayed on display 104 to be selected and allows for data to be input into computer system 102. For example suitable input devices include, but are not restricted to, a mouse, a trackball, a screen input device such as a touch screen used in conjunction with display 104, a voice input device, a joystick, a slide bar, a keyboard, a manually generated data set, an automatically generated data set, a network connection, an Internet connection, data sets imported from or generated by other applications including but to database programs and spread sheet programs. Additionally selection and input device 106 can be made up of two or more separate devices which in combination allow both a selection function and an input function.

In one embodiment of the invention the portion of 3-dimensional perspective data set 114 displayed on display 104 which corresponds to selected portion of 3-dimensional perspective data set 124 is highlighted. Input from selection and input device 106 is then used to modify data in 3-dimensional perspective data set 114. The modified data can then be used to update the display on display 104.

Figure 2:
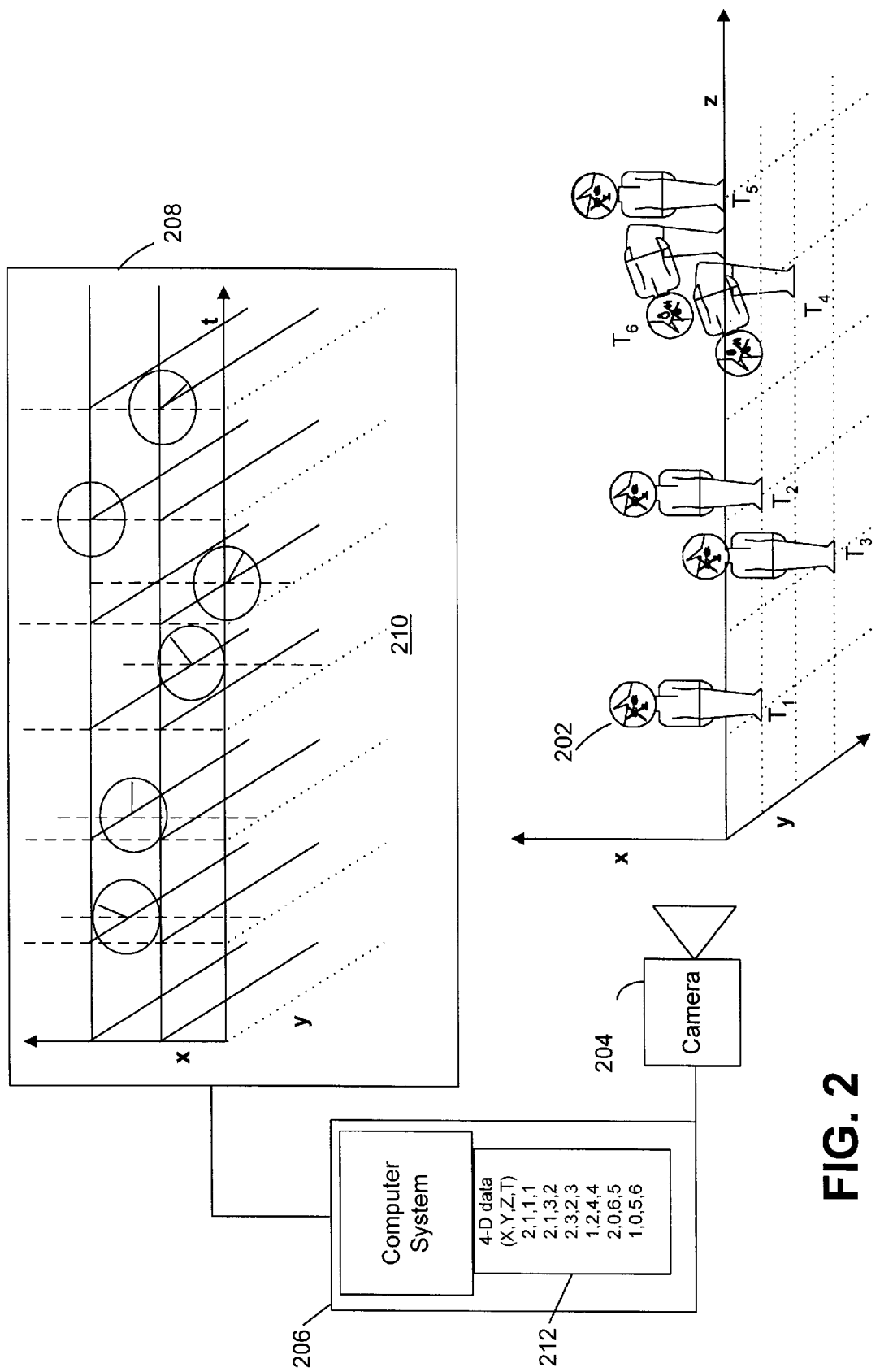
FIG. 2 depicts a subject moving in 3-dimensional space over time being viewed by a camera. The data generated by the camera is displayed in accordance with an embodiment of the invention using a 3-dimensional perspective data set and images.

FIG. 2 shows a more detailed view of a display of a 3-dimensional perspective data set. In FIG. 2 the movements of subject 202 in real space over time are input through camera 204 into computer system 206 and stored as four-dimensional data set 212. The four dimensions are x, y, z and t. Three of these dimensions x, y, and t are converted into a 3-dimensional perspective data set for display on display 208 in graph 210. In graph 210 physical dimension x is displayed vertically, physical dimension y is displayed in perspective coming out of the screen, and time in seconds is displayed on the horizontal axis. Physical dimension z is displayed as the rotational position of the hash mark in the circular image representing the x, y, t coordinate of the data on the screen. Without departing from the invention, any of the dimensions can be displayed on any axis. For example, the x and y dimensions, or the z and time dimensions could be interchanged without departing from the invention.

As depicted in FIG. 2, as subject 202 moves in the z dimension, the rotational position of the hash mark varies. The image displayed in the plot can be any image which has an attribute that can be varied to represent data, and any attribute of an image can be used to represent the data. For example, the image could be a square in which the data is represented by the area of the square, the color of the square, the perimeter of the square, the image could be an ellipse in which the data is represented by the angle the major axis of the ellipse makes with a reference line, or the image could be a playing card in which the data is represented by the value of the playing card. Additionally, the invention can be used to display more than one set of data using the image representation. Multiple data sets can be represented by different attributes of the image at a given point. For example, if an image of a triangle is used, one data set can be represented by the area of the triangle while a second data set can be represented by the orientation of the triangle. According to this aspect of the invention, 4-dimensional data or higher dimensional data can be displayed using the invention.

In one aspect of the invention, computer system 206 displays a 3-dimensional perspective data set in which icon positions and attributes are interpolated for data points between those actually input for camera 204. In this aspect of the invention the displayed 3-dimensional data set can be made to appear as a continuous set of data.

Figure 3:
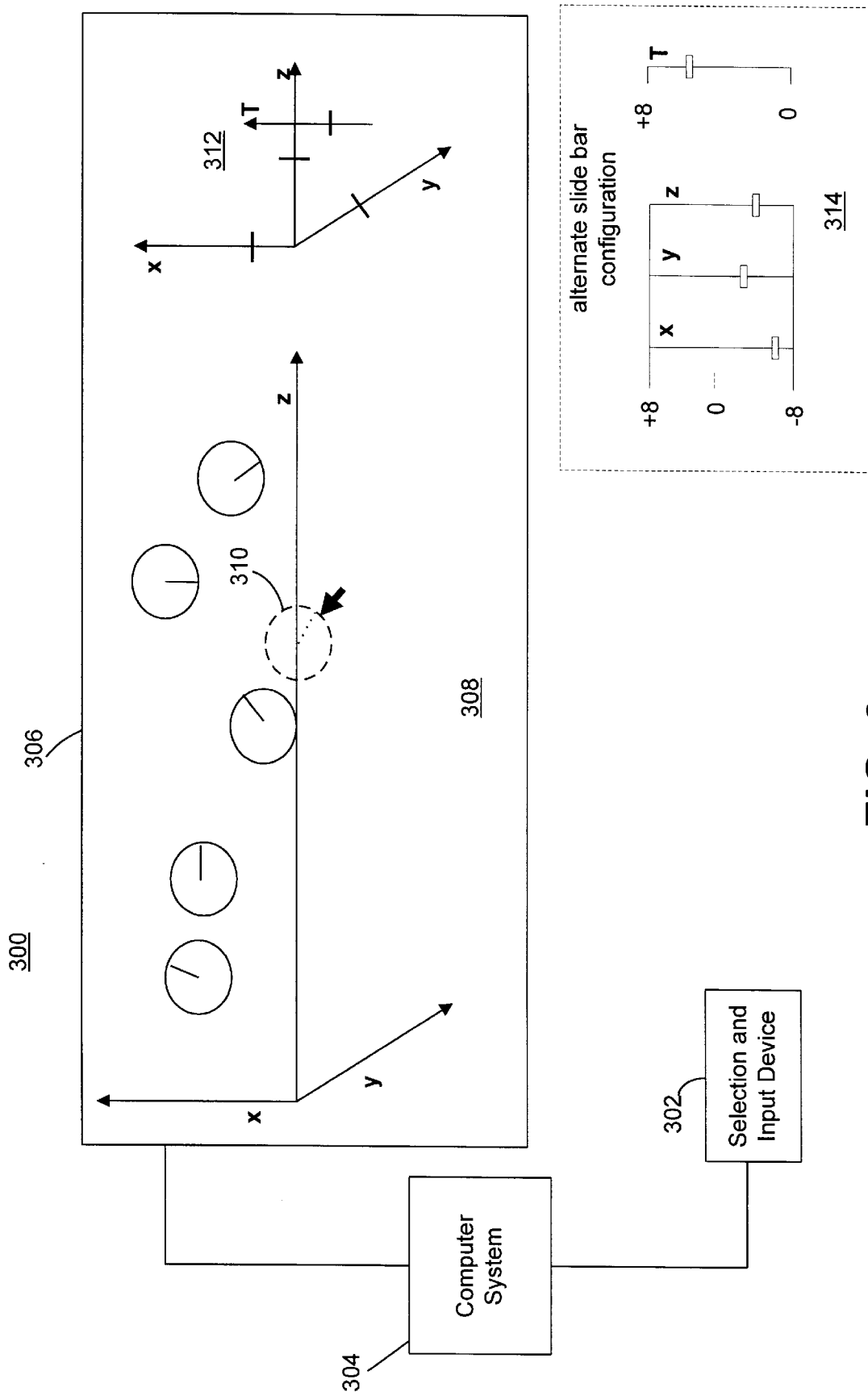
FIG. 3 depicts an image in the display being selected for modification using an embodiment of the invention.

FIG. 3 depicts system 300 with selection and input device 302 connected to computer system 304. Computer system 304 is connected to display 306 displaying graph 308. Selection and input device 302 receives a selection signal from a selection signal source which could be a user, another computer, or any other device which could output a selection signal. In the example depicted in FIG. 3, the selection signal has been used to select the image 310 on graph 308. In the embodiment of the invention shown in this figure, the image representing 310 is shown as dashed when it is selected. In other embodiments of the invention, the selected icon need not change its appearance, or it could change any aspect of its appearance to indicate that it has been selected. For example, the icon could change color, start to blink, or become brighter or dimmer.

In one embodiment of the invention, selection and input device 302 can be used to receive input to reposition the selected icon and change the icon attributes on display 306. The data set in Computer system 304 is then changed to reflect the repositioning of the icon and its attributes.

In another embodiment of the invention, when an icon is selected slide bars 312 appear on the display as shown in FIG. 3. Slide bars 312 can then be used to alter any of the data represented by the icon. Slide bars 312 may be moved using selection and input device 302. Alternate configuration 314 of the slide bars is depicted in FIG. 3. Alternate configuration 314 can be displayed instead of slide bars 312 or in addition to slide bars 312. Without departing from the invention, an arrangement other than slide bars can be used to represent the positioning of the icon and to allow for inputting of signals to alter the data set. For example the numerical values of the data represented by the icon could be displayed and the new data inputted by directly inputting new values for the data.

Figure 4:
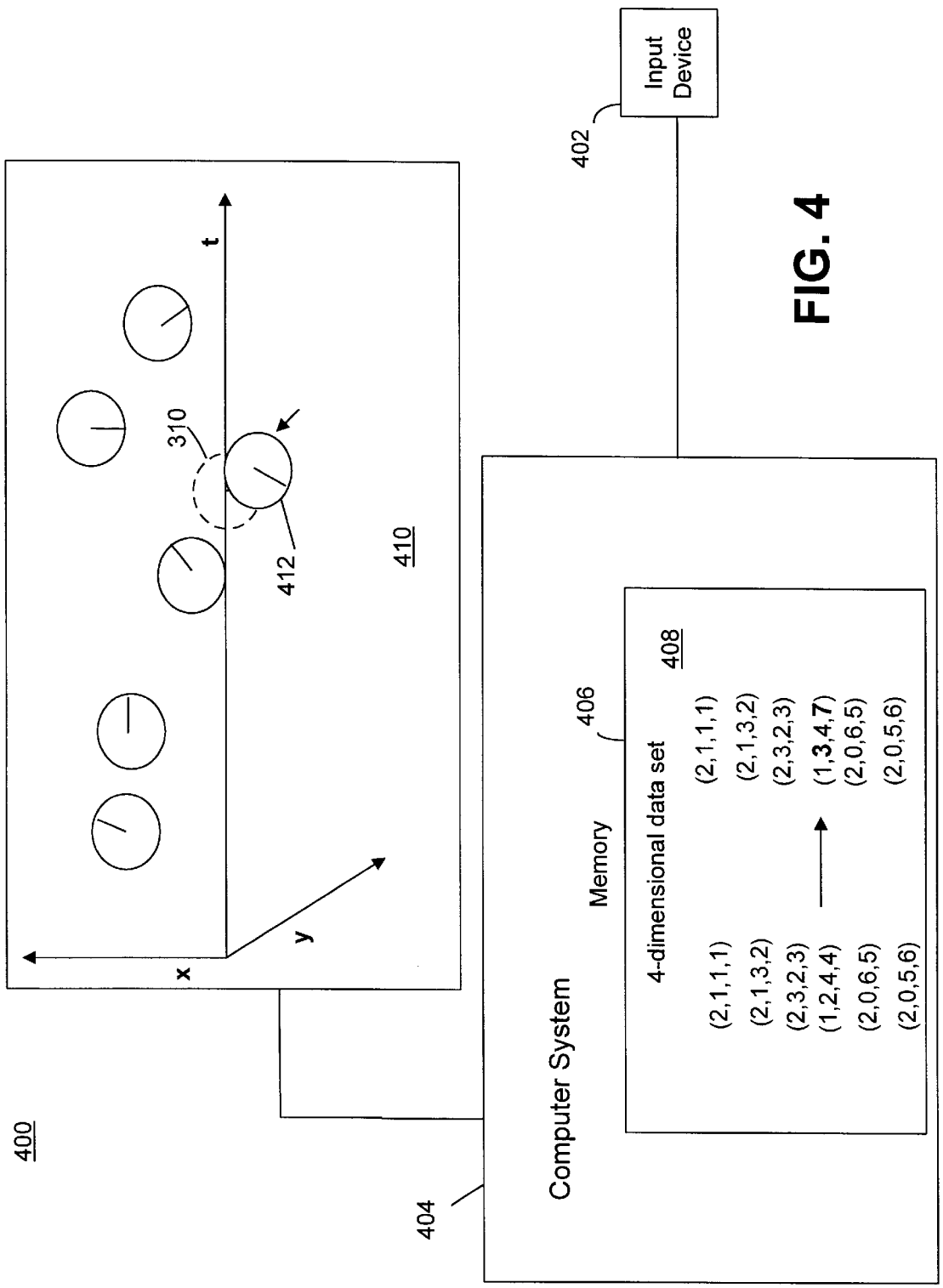
FIG. 4 depicts an image being moved and altered and the corresponding data being changed according to an embodiment of the invention.

FIG. 4 shows system 400 after a selection signal has selected image 310 and an input signal has been used to reposition image 412. System 400 depicts input device 402 connected to computer 404. Computer 404 includes memory 406 which contains 4-dimensional data set 408. In memory 406 the 4-dimensional data set is schematically depicted as having the data corresponding to the selected icon altered, with the altered data depicted in bold. The old data need not be preserved in memory 406 and is shown in the figure for explanatory purposes only.

Display 410 shows selected image 310 being moved from a y-position of 2 to 3, and the icon attribute representing time has been advanced from 4 to 7. The data representing the 4-dimensional data set can be stored in any format. For example, the data can be grouped by data point as depicted in FIG. 4, or by dimension, or as a differential between consecutive data points. Additionally, the 4-dimensional data set after it has been revised can be stored in any format which is appropriate. For example, the data can be stored as the original data set with a set of update data, or the original data can be overwritten by the new data.

Figure 5:
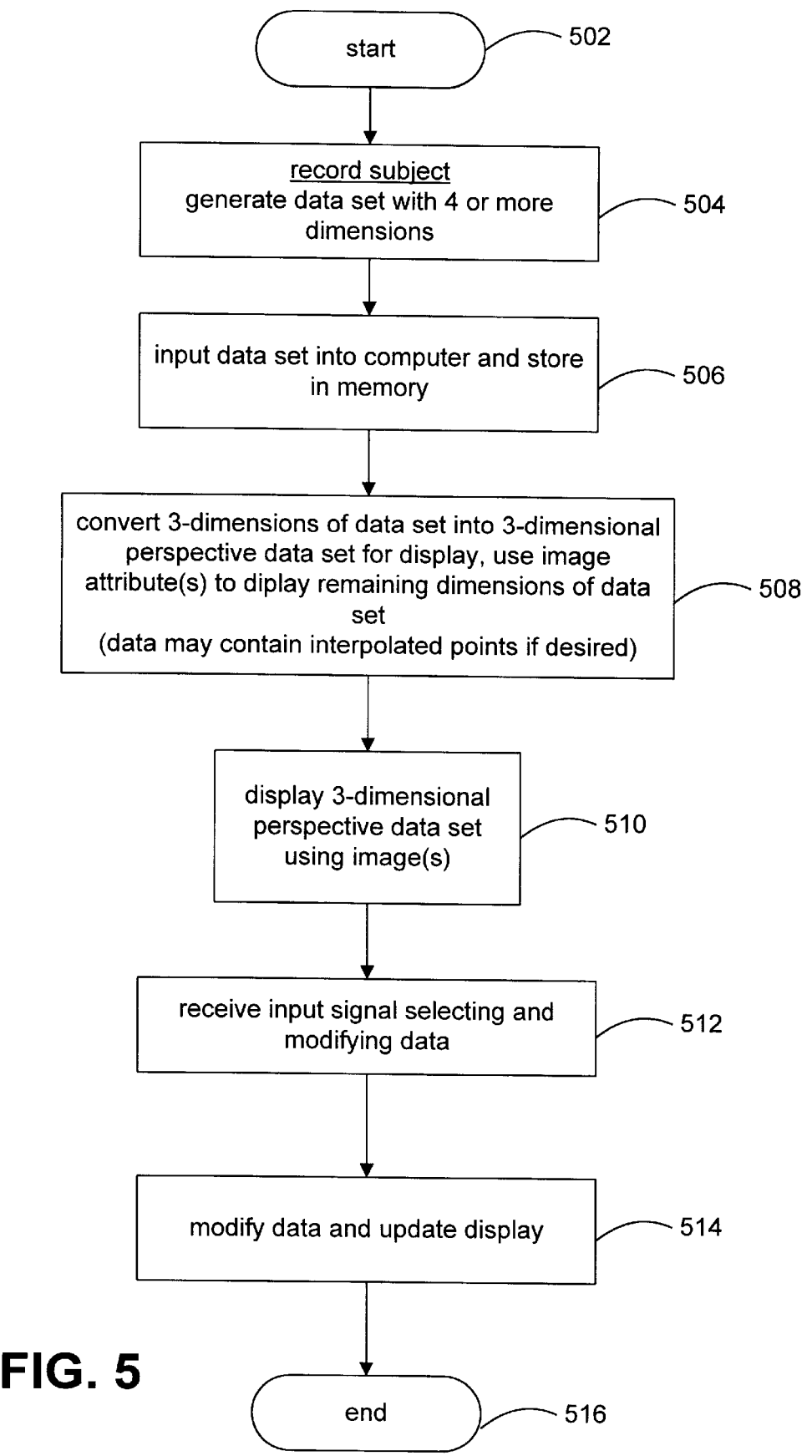
FIG. 5 shows a flowchart depicting capturing and modification of data in accord with an embodiment of the invention.

FIG. 5 is a flowchart describing one embodiment of the invention. The process starts at block 502 and proceeds to block 504. In block 504 a subject is recorded and a data set with 4 or more dimensions is generated. One of the dimensions includes a parameter related to time. In block 506 the data set is then input into a computer and stored in memory. In block 508 3-dimensions of the data set are converted into a 3-dimensional perspective data set for display. Any remaining dimensions of the data set which it is desired to display are displayed using image attribute(s). In one embodiment of the invention the computer interpolates data between the data points in the data set and displays images at the interpolated point. This may be done, for example, if it is desired to smooth out the motion represented by the data set or to display a continuous set of images representing the data set. In block 510 the 3-dimensional data perspective dat set is displayed on a display. In block 512 an input signal is received selecting and modifying a portion of the data. In block 514 the data is modified and the display is updated to reflect the modification of the data. The process ends in block 516.

The foregoing description of embodiments of the invention has been provided for the purposes of illustration and description. It is not intended to be exhaustive or to limit the invention to the precise form disclosed. Many modifications and variations will be apparent. The embodiments were chosen and described in order to best explain the principles of the invention and its practical application, thereby enabling others to understand the invention for various embodiments and with various modifications as are suited to the particular use contemplated. It is intended that the scope of the invention be defined by the following claims.

What is claimed is:

1. A method of displaying and manipulating a data set using a computer system, the computer system including a computer and a display device, the computer being coupled to the display device, the computer including a memory, the data set containing at least 4-dimensions wherein one dimension of the data is related to time, the method comprising:

storing the data set in the memory;

translating at least a portion of the data set, including the time related parameter, into a 3-dimensional perspective data set;

displaying an image at a position on the display device determined by the 3-dimensional perspective data set, wherein an attribute of the image represents data in the data set;

receiving a selection command selecting at least a portion of the image;

receiving a modification command modifying data in the data set corresponding to the portion of the image.

2. The method of claim 1, wherein:

the data represents the movement over time of a point in three dimensional space.

3. The method of claim 1, wherein:

the data represents the movement over time of a set of points in three dimensional space.

4. The method of claim 1, wherein:

the data represents the movement over time of a point in three dimensional space, and the point represents a point on a human face.

5. The method of claim 1, wherein:

the data represents the movement over time of a point in three dimensional space, and the point represents a point on an articulated form.

6. The method of claim 1, wherein:

the portion of the data set translated into the 3-dimensional perspective data set is a 3-dimensional subset of the data.

7. The method of claim 1, wherein:

the 3-dimensional perspective data set is a mapping of 3-dimensions of the data set onto 2-dimensions.

8. The method of claim 1, wherein:

the data set has data corresponding to a first spacial dimension, a second spatial dimension, and the time related parameter; and the data that is translated into the 3-dimensional perspective data set includes the first spacial dimension, the second spacial dimension, and the time related parameter.

9. The method of claim 1, wherein:

the attribute of the image includes a color of the image.

10. The method of claim 1, wherein:

the attribute of the image includes a diameter of the image.

11. The method of claim 1, wherein:

the attribute of the image includes a rotational orientation of the image.

12. The method of claim 1, wherein:

the image includes a plurality of discrete images.

13. The method of claim 1, wherein:

the image includes a plurality of discrete images, and discrete images in the plurality of discrete images represent data points in the data set.

14. The method of claim 1, wherein:

the image includes a plurality of discrete images, and each discrete image represents one data point in the data set.

15. A computer system for displaying and manipulating a data set, the computer system including a computer and a display device, the computer being coupled to the display device, the computer including a memory, the data set containing at least 4-dimensions wherein one dimension of the data includes a parameter related to time, the computer system comprising:

a resource that stores the data set in the memory;

a resource that translates at least a portion of the data set, including the parameter related to time, into a 3-dimensional perspective data set;

a resource that displays an image at a position on the display device determined by the 3-dimensional perspective data set, wherein an attribute of the image represents data in the data set;

a resource that receives a selection command selecting at least a portion of the image; and a resource that receives a modification command modifying data in the data set.

16. The system of claim 15, wherein:

the data represents the movement over time of a point in three dimensional space.

17. The system of claim 15, wherein:

the data represents the movement over time of a set of points in three dimensional space.

18. The system of claim 15, wherein:

the data represents the movement over time of a point in three dimensional space, and the point represents a point on a human face.

19. The method of claim 15, wherein:

the data represents the movement over time of a point in three dimensional space, and the point represents a point on an articulated form.

20. The system of claim 15, wherein:

the portion of the data set translated into the 3-dimensional perspective data set is a 3-dimensional subset of the data.

21. The system of claim 15, wherein:

the 3-dimensional perspective data set is a mapping of 3-dimensions of the data set onto 2-dimensions.

22. The system of claim 15, wherein:

the data set has data corresponding to a first spacial dimension, a spacial second dimension, and the time related parameter; and the data that is translated into the 3-dimensional perspective data set includes the first spacial dimension, the second spacial dimension, and the time related parameter.

23. The system of claim 15, wherein:

the attribute of the image includes a color of the image.

24. The system of claim 15, wherein:

the attribute of the image includes a diameter of the image.

25. The system of claim 15, wherein:

the attribute of the image includes a rotational orientation of the image.

26. The system of claim 15, wherein:

the image includes a plurality of discrete images.

27. The system of claim 15, wherein:

the image includes a plurality of discrete images, and discrete images in the plurality of discrete images represent data points in the data set.

28. The system of claim 15, wherein:

the image includes a plurality of discrete images, and each discrete image represents one data point in the data set.

29. A computer program product, comprising:

a computer usable medium having a computer readable program code embodied therein for causing a computer to display a data set, the data set containing at least 4-dimensions wherein one dimension of the data in the data set is related to time, the computer readable code comprising:

computer readable program code that translates at least a portion of the data set, including the dimension related to time, into a 3-dimensional perspective data set;

computer readable program code that displays an image at a position on the display device determined by the 3-dimensional perspective data set, wherein an attribute of the image represents data in the data set;

computer readable program code that receives a selection command selecting at least a portion of the image; and computer readable program code that receives a modification command modifying data in the data set corresponding to the portion of the image.

30. The product of claim 29, wherein:

the data represents the movement over time of a point in three dimensional space.

31. The product of claim 29, wherein:

the data represents the movement over time of a set of points in three dimensional space.

32. The product of claim 29, wherein:

the data represents the movement over time of a point in three dimensional space, and the point represents a point on a human face.

33. The method of claim 29, wherein:

the data represents the movement over time of a point in three dimensional space, and the point represents a point on an articulated form.

34. The product of claim 29, wherein:

the portion of the data set translated into the 3-dimensional perspective data set is a 3-dimensional subset of the data.

35. The product of claim 29, wherein:

the 3-dimensional perspective data set is a mapping of 3-dimensions of the data set onto 2-dimensions.

36. The product of claim 29, wherein:

a dimension of the 3-dimensional perspective data set is the time related parameter.

37. The product of claim 29, wherein:

the data set has data corresponding to a first spacial dimension, a spacial second dimension, and the time related parameter; and the data that is translated into the 3-dimensional perspective data set includes the first spacial dimension, the second spacial dimension, and the time related parameter.

38. The product of claim 29, wherein:

the 3-dimensional perspective data set includes 2-dimensional data.

39. The product of claim 29, wherein: the attribute of the image includes a color of the image.

40. The product of claim 29, wherein: the attribute of the image includes a diameter of the image.

41. The product of claim 29, wherein:

the image includes a plurality of discrete images.

42. The product of claim 29, wherein:

the image includes a plurality of discrete images, and discrete images in the plurality of discrete images represent data points in the data set.

43. The product of claim 29, wherein:

the image includes a plurality of discrete images, and each discrete image represents one data point in the data set.

* * * * *